UNITED STATES PATENT OFFICE.

JESSE RUST, OF BOND STREET, VAUXHALL, ENGLAND.

IMPROVEMENT IN COMPOUNDS FOR SANITARY AND DECORATIVE ARTICLES USED IN BUILDING.

Specification forming part of Letters Patent No. 143,096, dated September 23, 1873; application filed March 12, 1873.

*To all whom it may concern:*

Be it known that I, JESSE RUST, of Bond street, Vauxhall, in the county of Surrey, in England, have invented a new and Improved Composition, specially applicable for use for sanitary, pictorial, decorative, and building purposes; and I do hereby declare the following to be a full, clear, and exact description of the same.

The invention relates to the compositions for sanitary, pictorial, decorative, and building purposes, hereinafter fully described and pointed out in the claims.

First. I take glass of any kind, (old and broken will, however, answer, and be the most economical for my purpose.) I grind or reduce this to powder, and mix with it the same weight of sand or ground flints, though more or less sand or ground flints may sometimes be used. This mixture I then place in a reverberatory or other suitable furnace and fuse the mass together, and when fused and cold I reduce the same to powder, and this powder I afterward press into molds in a dry or in a dampened state by adding water or any glutinous liquid—starch, glue, and silicate of soda, for instance, being very useful for my purpose.

Secondly. These blocks or molded pieces, small or large, I place in a potter's or such like kiln, and bake them in same way as pottery-ware. When cold they are fit to use, and form a material which may be polished, painted, glazed, or decorated like fictile ware.

Thirdly. When I want a cheaper material, I take the fused mixture of glass, sand, or ground flints as it comes from the reverberatory furnace, and I reduce it to powder, and then mix therewith two parts, or more, of sand or ground flints, and one, or thereabout, of china-clay, or other clay; and this I press into molds, as before, and mix with water or glutinous liquid, as before, and then treat the same in manner above described under head "secondly."

For sand I can, when desired, use any analogous material—such as ground sandstone, for instance; and for or in addition to glass or flint I can use analogous material—such as feldspar or iron slag, or iron-furnace refuse.

In order to produce blocks or pieces of material colored throughout their substance, I introduce the coloring substances used by glass-manufacturers for coloring glass, such as may be suitable for producing the required color, by placing the same in the reverberatory or other suitable furnace, the process of reducing to powder, baking, and polishing being as applicable to these colored blocks as to those not colored.

In some cases, where superiority of material is not required, it may not be necessary to grind or paint the glass before fusing it with sand; also, I can mix the glass or analogous material with the sand or analogous material, or sand and clay, and press the same into blocks or pieces, and bake and treat the same, as described.

Having thus described my invention, what I claim as new, and desire to secure by Letters Patent, is—

1. A compound formed of equal parts of ground glass and sand, or their equivalents, fused, cohered by some liquid, molded, and baked, in the manner and for the purpose described.

2. A compound of equal parts of fused and powdered glass and sand, mixed with two or more parts of clay or sand, cohered with liquid, molded, and baked, as set forth, and for the purpose specified.

The above specification signed by me this 5th day of October, A. D. 1872.

JESSE RUST. [L. S.]

Witnesses:
R. MARSDEN LATHAM,
    21 *Cockspur street, London.*
THOMAS MORGAN,
    21 *Cockspur street, London.*